W. G. STEWART.
BATH TUB SUPPLY PIPE CONNECTION.
APPLICATION FILED JUNE 9, 1909.
985,853.
Patented Mar. 7, 1911.
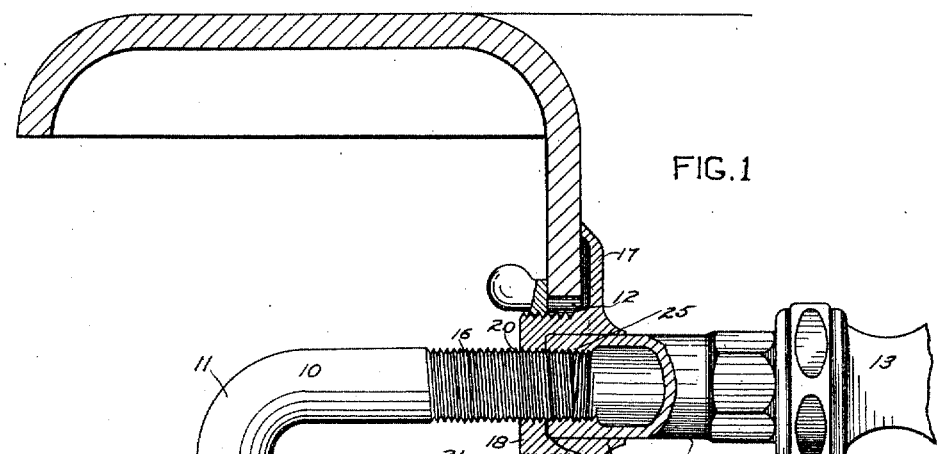
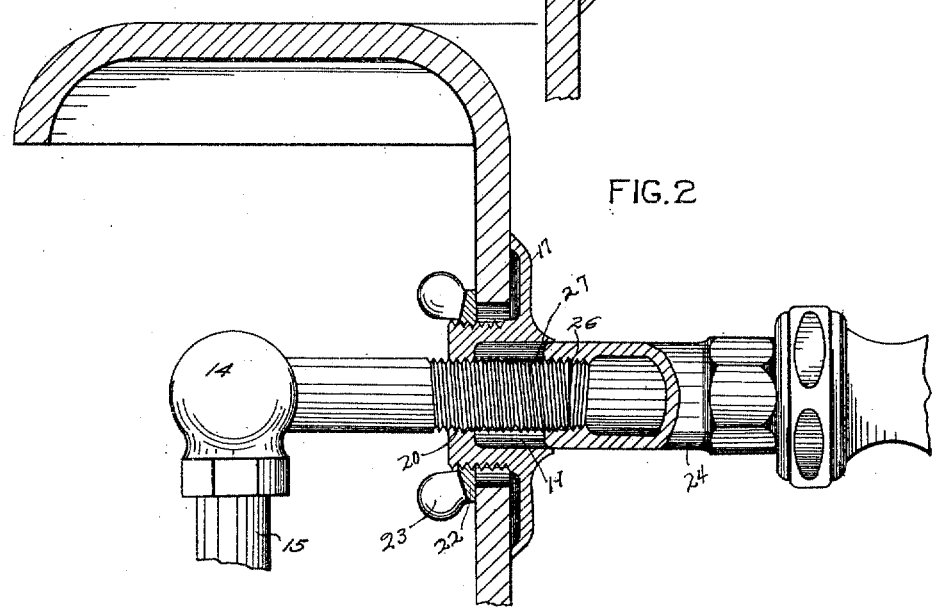
WITNESSES
K. Waddell
Virginia Hamilton
INVENTOR
William G. Stewart.
BY
John L. Waddell
ATTORNEY.
THE NORRIS PETERS CO., WASHINGTON, D. C.

UNITED STATES PATENT OFFICE.

WILLIAM G. STEWART, OF CLEVELAND, OHIO, ASSIGNOR TO H. MUELLER MANUFACTURING COMPANY, OF DECATUR, ILLINOIS, A CORPORATION OF ILLINOIS.

BATH-TUB SUPPLY-PIPE CONNECTION.

985,853.  Specification of Letters Patent.  Patented Mar. 7, 1911.

Application filed June 9, 1909. Serial No. 501,036.

*To all whom it may concern:*

Be it known that I, WILLIAM G. STEWART, a citizen of the United States, and a resident of Cleveland, Cuyahoga county, State of Ohio, have invented certain new and useful Improvements in Bath-Tub Supply-Pipe Connections; and my preferred manner of carrying out the invention is set forth in the following full, clear, and exact description, terminating with claims particularly specifying the novelty.

This invention relates to baths and closets and more especially to bath and basin fittings and the object of the same is to facilitate the attachment of the fitting to a bath tub, and the coupling of a single or compound cock or faucet thereto.

Another object is to lessen the labor and expense of manufacturing by reducing the number of parts to a minimum, yet without sacrificing the utility of the fitting or producing difficulty with its use even in limited quarters.

Still another object is to provide for a joint between the parts whereby variation in adjustment may be had without interfering with the purpose of the device; and still a further object is to provide for variation in the size of the supply.

This device is an addition to the line represented in my Letters Patent #886,888 on a bath tub supply pipe connection and as stated the usual commercial manner of connecting the supply pipes and the faucets of bath tubs is by means of an inground joint located at the outside of the tub, said joint being formed between the supply pipe and a sleeve which extends through an aperture in the end of the tub, said sleeve being connected to the faucet fixture by means of a gland. Connection between the supply pipe and this sleeve is made by means of a gland, by tightening which, the inground joint is more or less closed. In order to connect the pipe and fixture, it is necessary to operate on the outside of the tub and under the rim of the same, making it difficult to apply and operate a wrench. This difficulty is frequently increased by the small extent of space provided for the tub, such space often being so short as to leave practically no clearance between the end of the tub and the wall. These restrictions, with the location of the supply pipe beneath the rim, make the application of a wrench to the gland very difficult. Furthermore, the joint is faulty and frequently leaks and is considered generally by plumbers as one of the most undesirable repair jobs which they are called upon to make.

The object of my invention is to obviate the above difficulties, provide a better and tighter joint, and at the same time economize in the cost of material used in making the joint.

To this end the invention consists in a fitting which comprises a supply pipe adapted to pass through a hole in the tub wall and its body threaded where it passes through said hole, a flange having an extended body adapted to pass through the aperture from within the tub, exterior threads on said extension, an outer nut adapted to engage said extension and thumb wings thereon, a well within said flange and its extension, an aperture in the bottom of said well adapted to engage the threaded end of the supply pipe, a detachable shank adapted to fit slidably within said well and to engage the threads on the inner end of the supply pipe after the flange extension has engaged them and a nut mounted on the outer end of the shank for attaching the cock or faucet.

In the drawings forming a part of this specification, Figure 1 is a sectional view showing my preferred form of this fitting clamped to a tub wall and the supply pipe broken away adjacent its bend; Fig. 2 is a sectional view of the same form showing variation in adjustment.

Referring to the accompanying drawings, the numeral 10 designates a supply pipe coming from the floor or any other suitable connection and continuous from said floor connection upward through its bend 11 through an aperture 12 in the bath tub to a cock 13 although in Fig. 2 the supply pipe 10 is made shorter, and beyond its bend is mounted a threaded ball or other suitable connection 14 for connection with another section of the supply pipe 15 if desired or for connection with a service in case the same should stand above the floor line. In Fig. 1, where the supply pipe 10 passes through the tub wall it is provided with exterior threads 16 larger than the diameter of the body of the pipe and of less diameter than the aperture 12. A flange 17, which may be of any ornamental design on its exterior face, has a body extension 18 adapted to pass through the aperture 12 and is provided interiorly with a well 19 at the bottom of which is an inner threaded hole 20 adapted to engage the exterior threads 16 of the supply pipe 10. The said body extension is provided exteriorly with threads 21 onto which is threaded a clamping member or nut 22 having thumb wings 23. The cock shank 24 is adapted to fit slidably within the well 19 and at its inner extremity is provided with threads 25 which also engage the threads 16 of the supply pipe 10 and when so attached there is formed between the supply pipe 10 and the flange extension 18 and the cock shank 24, a double joint as 26 as shown in Fig. 1, which insures against possibility of leakage.

The flange with its extension is adjustable upon the threaded end 16 of the supply pipe 10 independent of the faucet shank 24, thus allowing quite a variation between the parts longitudinally, in order to readily adapt the fitting to a supply pipe which may be more or less out of alinement on account of the "roughing in" or on account of other fixtures or to estimate any changes which may be made in the installation or the location of the fixtures permitting the bath tub to be moved at even a greater distance from the point where the pipes are "roughed" or vice versa, but in all of the adjustment it is my desire that the well 19 of the flange 17 occupy a position on the supply pipe 10 as to envelop the inner end of the faucet shank 24 and give it a completed finish, but as will be seen in Fig. 1 the flange 17 and the faucet shank 24 are mounted on a supply pipe 10 in such a manner as to form a joint at the extreme inner end of the same and in Fig. 2, I show the extreme or exactly opposite position as that shown in Fig. 1; however there are a number of variations which could be adapted here in view of this adjustment which I believe will be readily understood by those skilled in the art and will not demand illustration.

In having the well 19 of the flange 17 envelop or inclose the end of the faucet shank 24, I hide from view any threads or depressions on the supply pipe which would otherwise be exposed or allow dirt to lodge, in which instances it likewise becomes sanitary as well as ornamental.

In setting up this device the supply pipe 10, with the clamping member 22, thereon is brought to the outside of the tub, and the flange 17 with its body extension 18 is brought from the inside of the tub with the extension entering the aperture 12 thereof and the threads 20 caused to engage the threads 16 on the supply pipe and the clamping member 22 is then brought into position on the exterior threads 21 of the extension 18 and thereby the flange is clamped to the tub wall with the supply pipe in position. The faucet shank 24 is placed into the well 19 of the flange 17 and the threads 25 thereof engage the threads 16 of the supply pipe 10 which extends interiorly beyond the wall of the extension and to the well 19 whereby a joint is formed between the threads 16 and 20 and between the threads 16 and 25. A bath cock 12 is mounted in any suitable and well known manner at the outer end of the faucet shank 24 within the tub; the parts are then adjusted and tightened and loosened until the fitting assumes a fixed position relative to the tub and the final work of placing the bath cock in position is done entirely within the tub. The supply connections outside of the tub wall are made in the usual manner.

What I claim as new is:

1. The combination with a bath tub having an aperture in an end wall thereof, a supply pipe having a threaded end projecting through said aperture and into the tub, said supply pipe having a detachable joint adjacent the aperture, a flange within the tub engaging the supply outside of the aperture, a well within the flange, a shank adapted to slidably engage the well and means therein for engaging the supply, and a clamping member on the exterior of the tub independent of the supply for holding the fitting in position.

2. A bath tub fitting, a supply pipe having its upper end exteriorly threaded and adapted to pass through the aperture of a tub wall, a flange, and an extension integral therewith adapted to pass through the aperture and engage the supply pipe adjacent said aperture, means on said extension for engaging a clamping member, a faucet shank adapted to engage the inner end of the supply and means for adjusting said flange and said shank independently of each other.

3. In a bath tub fitting comprising a supply pipe having its upper extremity exteriorly threaded and adapted to pass through an aperture in the tub wall, a flange, and an extension integral therewith, exteriorly threaded, adapted to clamp the tub wall adjacent the aperture and to receive the supply pipe, a clamping member mounted on the extension exterior to the tub of greater diameter than the supply pipe and the aperture, a faucet shank adapted to slidably engage the flange and threaded to engage the supply pipe and means for permitting variation of movement between the flange and the shank.

4. A bath and basin fitting comprising a flange having a well in its front wall, and provided with an externally threaded, rearward extension having a threaded opening in its rear wall adapted to receive a supply pipe, combined with a faucet shank adapted to slidably enter said well, said shank also having a threaded opening at one end in alinement with the opening in the extension and a clamping member adapted to screw upon the said extension.

5. A fitting of the character described, comprising a flange having on one side an externally threaded sleeve-like extension adapted to project through an opening in a lavatory member, a lock-nut screwed upon said extension and adapted, with the flange, to clamp the fitting to such lavatory member, said flange having a relatively deep well formed in its front face which well extends into the said sleeve-like extension, and the extension having a rear wall provided with a threaded opening of less diameter than the diameter of the well, combined with a shank member having one end freely entering said well and its other end extending outward therefrom and adapted to receive a faucet, said shank member having a threaded opening in its said entering end, and a supply-pipe having a threaded end adapted to enter and have threaded engagement with the said sleeve-like extension and with the shank member respectively.

In testimony whereof, I have hereunto subscribed my signature, this 23rd day of May, A. D. 1909.

WILLIAM G. STEWART.

Witnesses:
A. C. CALEB,
JOHN L. WADDELL.

Copies of this patent may be obtained for five cents each, by addressing the "Commissioner of Patents, Washington, D. C."